Aug. 1, 1967  J. G. DE FLON  3,333,835
COOLING TOWERS

Filed Nov. 26, 1965  2 Sheets-Sheet 1

INVENTOR.
JAMES G. DE FLON,
By His Attorneys
Spensley & Horn

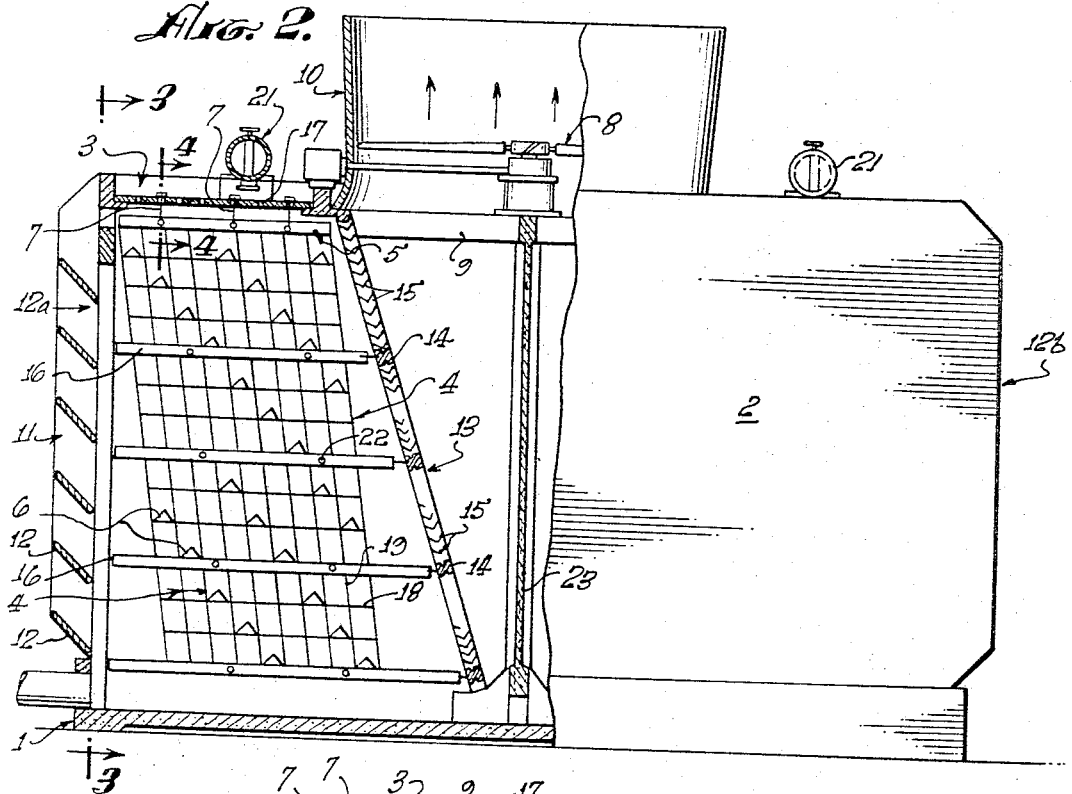
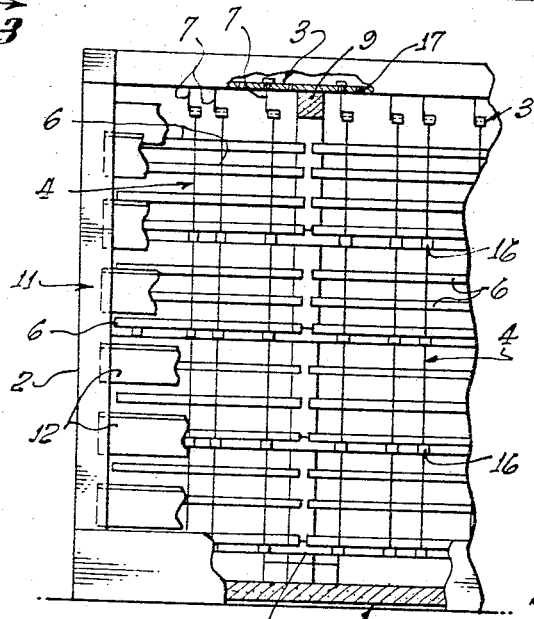

United States Patent Office 3,333,835
Patented Aug. 1, 1967

3,333,835
COOLING TOWERS
James G. De Flon, Whittier, Calif., assignor to Deflon-Anderson Co., Inc., San Dimas, Calif., a corporation of Delaware
Filed Nov. 26, 1965, Ser. No. 510,016
2 Claims. (Cl. 261—111)

This application is a continuation-in-part of copending application Ser. No. 302,587, filed Aug. 16, 1963, now abandoned.

This invention relates to cooling towers and more particularly to large industrial concrete cross-flow cooling towers utilizing splash type fill for cooling fluids of various kinds such as water and the reverse operation for cooling air with water.

Industrial concrete cross-flow cooling towers are employed for cooling fluids in oil refineries, chemical plants, power plants and the like. The type of cooling tower with which the present invention is concerned is the type in which the water to be cooled is broken into globules and caused to pass downwardly through a filling of splash bars as currents of air are directed through the cooling tower into contact with the water globules. Cross-flow cooling towers of the type with which the present invention is concerned, comprise primarily a large housing through the sides of which air is admitted and from the top of which the air is exhausted by suitable fans. The water to be cooled is distributed throughout the housing from the upper surface of the housing by means such as a distributing pan. The water falls by gravity to a basin at the lower portion of the housing. During its descent it is broken into the smallest globules possible by splashing upon fill bars which are interspersed throughout the housing to thus break up the downward flow of water and provide surface area of the water for commingling the water and air passing through the housing to promote cooling.

In the prior art large industrial concrete cooling towers have not been competitive with conventional towers fabricated of timber. This has been primarily because the support system for the fill or splash bars usually consists of a multiplicity of columns and beams for supporting the fill bars or units of fill bars. Reinforced concrete is most competitive with timber structures when the concrete is formed in large beams, slabs and columns and becomes non-competitive when the beams and columns of concrete are to be formed in relatively small cross-sectional components. The costs per cubic yard of concrete increases very rapidly as the cross-sectional area of these beams and columns used to form the structure decreases because of the increased cost of labor and materials used in forming the parts.

The advantages of utilizing concrete in place of wood and metal construction is apparent, primarily due to the increased life of the structure since the concrete structure will not deteriorate as does wood and metal by rotting and rusting.

The present invention provides an improved construction for concrete cross-flow cooling towers and comprises an essentially concrete housing which defines a hollow structure free from obstructions. The cooling tower fill is supported within the hollow structure from the top of the structure by means of a wire mesh. Fill bars are threaded through the apertures in the wire mesh. The wire mesh in turn is sloped at an angle to conform to the migration of the water with the air stream as the water falls and splashes. The slope of the mesh is predetermined to be approximately equal to the path of flow of the water. Horizontal tie bars are provided to maintain the wire mesh in its predetermined location and to maintain the alignment of the various elongated fill members. The fill portion of the cooling tower structure in accordance with the present invention is thus easily installed and is removable from the hollow concrete shell to thereby greatly reduce the cost of the complete cooling tower.

Accordingly, it is an object of the present invention to provide an improved cooling tower structure formed of a concrete housing in such manner that the housing defines an essentially hollow interior into which the fill assembly can be removably positioned.

Another object of the present invention is to provide an improved fill assembly which can be removably positioned and aligned within the cooling tower housing.

It is a further object of the present invention to provide an improved cooling tower construction which is simple and efficient in operation and economical to construct.

It is another object of the present invention to provide an improved cooling tower construction which requires no structural additions to the housing structure for positioning the fill assembly therein.

The novel features which are believed to be characteristic of the invention, both as to its organization and method of operation, together with further objects and advantages thereof will be better understood from the following description considered in connection with the accompanying drawings in which a presently preferred embodiment of the invention is illustrated by way of example. It is to be expressly understood, however, that the drawing is for the purpose of illustration and description only, and is not intended as a definition of the limits of the invention.

In the drawings:

FIG. 2 is a view in elevation and partly in section of a presently preferred embodiment of the present invention;

FIG. 3 is a sectional view taken along line 3—3 of FIG. 2; and,

Figure 1:
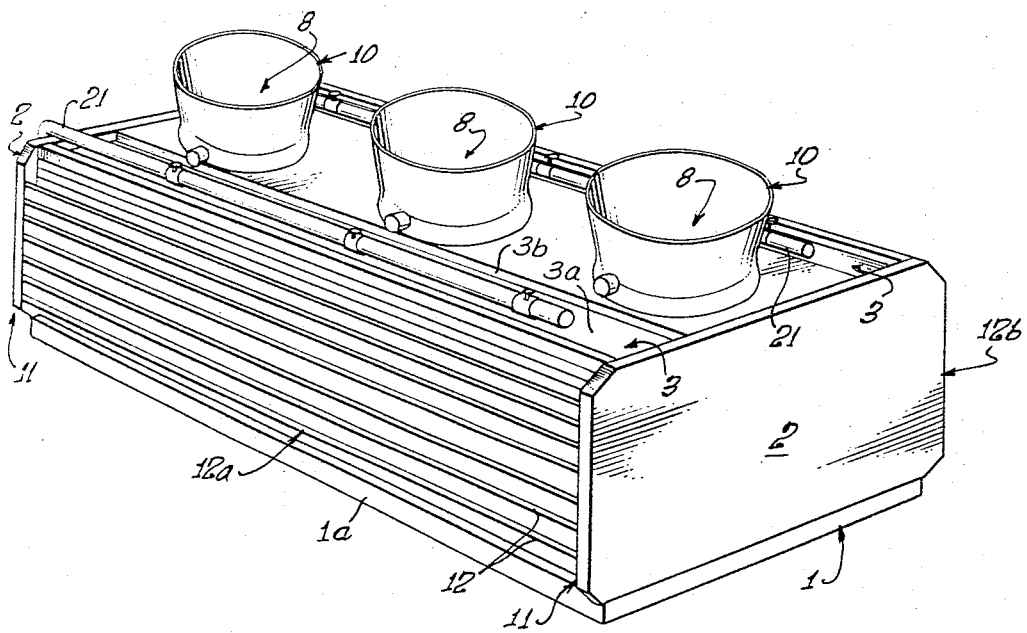
FIG. 1 is a view in perspective of a double air intake cross-flow cooling tower.

In the drawings a double air intake cooling tower is illustrated as the presently preferred embodiment. It is to be understood however, that the present invention is equally applicable to single air intake cross-flow designs and to cooling tower structures having different shapes and configurations.

Referring now to the drawings, the present invention comprises in general terms a housing which includes a foundation slab or cooling tower base of reinforced concrete or suitable material. Such base is designated generally by the reference numeral 1. The base includes upright perimeter walls 1a. The base and walls are of reinforced concrete or other imperforate material which is suitably supported. The dimensions of the base are, of course, determined by the size of the cooling tower structure and are suitably equipped with foundations as necessary. The upper surface of the tower housing is defined by a roof which is positioned above and generally horizontally to the base. The roof is of reinforced concrete and defines distributing pans 3 therein, positioned at each side of the center line of the housing. The roof also defines air outlet openings in communication with a fan stack 10 in which an exhaust fan 8 of the type well known in the art is positioned. The roof is spaced from the base by end walls 2 which are also formed of reinforced concrete or other imperforate materials and attached to the roof and base in accordance with standard building practice. Suitable structural members such as the concrete beams 9, as shown in FIGURE 2, extend transversely through the housing to support the roof member including the distributing pans, fan stacks, and fans. The concrete beams 9 are in turn supported by vertical columns such as the columns shown in FIG. 2 and designated as 11 at the outer edge of the base 1 and roof member. The outer columns such as 11 also are the louver columns of the structure. Thus, between adjacent vertical columns 11 at the sides of the housing there are positioned louvers 12 in a manner well known to the art to provide side air inlet walls to the cooling tower housing. The louvers are typically inclined to prevent the splashing of liquid from the cooling tower while still providing air ingress to the tower. Through the housing, the flow of air is through the side walls defined by the columns 11 and louvers 12 substantially horizontally through the cell and upward through the exhaust fan stack 10. This air movement is induced, of course, by the exhaust fan 8. In addition to the transverse beams 9 and vertical columns 11 the housing is further reinforced by drift eliminator columns 13 which are spaced longitudinally through the housing and which extend from a point proximate the midpoint of the base to a point adjacent the inner edge of the distributing pan 3, i.e., at the outer edge of a fan stack. These columns 13 serve also as a means for mounting louvers therebetween for maintaining the air flow in the desired pattern and minimizing the exhaust of water vapor through the air outlet fan stacks 10. Further, to maintain the desired air flow there is provided a vertical separating wall 23 which extends from the base 1 to the roof line of the structure. The vertical wall 23 serves to reinforce the housing by furnishing additional support for the transverse beams 9 as well as to separate the cells of the double air intake cooling tower. Thus, air inlet is provided through each of the louvered side walls 12a and 12b in the figure and air is conducted inwardly through the opposite sides of the cooling tower and outwardly from the fan outlet stack. The distributing pan of the apparatus is defined by the roof structure to include a pan slab 3a with longitudinally extending curbs 3b. The end walls of the housing form the end walls of the distributing pan. The base or slab 3a of the distributing pans is defined by the concrete roof of the cooling tower. As discussed hereinbefore both the roof and curb structures are formed of reinforced concrete. Through the distributing pan a plurality of openings are provided at regularly spaced intervals. Thus, water conducted into the pan will flow through the roof of the structure at the area defined by the curbs 3b and end walls 2 and will drop into the interior of the cooling tower housing at regularly spaced intervals. Such openings are shown through the floor or slab 3a of the distributing pan 3 in FIG. 4 and are designated as water inlet openings 17.

At vertical intervals as discussed hereinafter there are provided horizontally extending beams 14 between the drift eliminator columns 13. These horizontally extending beams 14 serve to support drift eliminator louvers 15 and also to provide a means for affixing the ends of the tie bars 16 as discussed more fully hereinafter.

Thus, it can be seen that the housing for the cooling tower in accordance with the present invention is simple in construction and design in that it forms essentially a hollow shell with a minimum number of structural components. The majority of these components are readily formed of reinforced concrete in a manner which is simple and efficient. The structural components required are only those necessary to impart strength and rigidity to to the housing structure. As will be seen hereinafter no additional supports or structural elements are required for the placing and insertion of the fill assembly.

Figure 4:
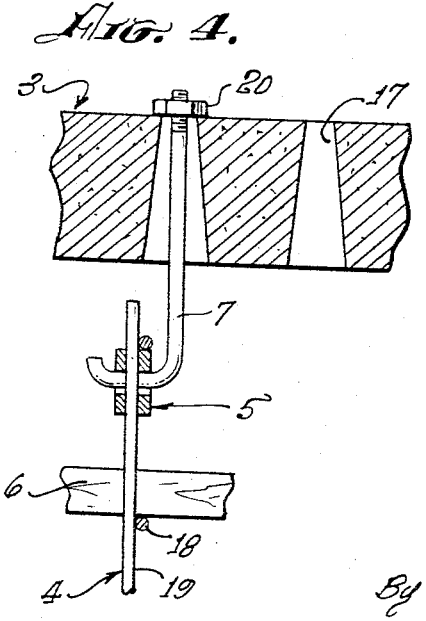
FIG. 4 is a sectional partial view taken along line 4—4 of FIG. 2.

In the state of the art prior to the present invention it has been the usual practice to install a multiplicity of fill assemblies throughout the fill area of the cooling tower. Such fill assemblies have typically been constructed of a large number of fill units which in turn are comprised of a large number of horizontally extending splash bars. These splash bars have been supported in layers or cubes by a large number of vertical columns positioned within the fill area of the tower. Thus, typically in the prior art each fill unit which comprises a large number of layers of splash bars has been positioned between four vertical columns with horizontal stringers. Each such fill unit was individually supported by a multiplicity of such horizontal stringers and vertical columns. Such construction involves a great many small pre-cast concrete pieces if the structure is to be formed of concrete or an excessive amount of labor in the formation of timbered fill assembly units. In accordance with the present invention, a greatly improved stronger, inexpensive, fill assembly is utilized within the housing as previously described. This fill assembly is particularly useful and economical in that it omits all interior posts, cross-braces, and interconnecting horizontal fill supports in the fill chamber. In accordance with the present invention, the horizontal fill bars are supported by a plurality of vertical hangers each of which comprises a wire mesh grid 4 suspended vertically from the underside of the water distributing pan 3 and having a length equal to the height of the fill assembly within the cooling tower. These vertical hangers are spaced longitudinally within the fill area of the housing at distances less than the length of the fill bars to be used in the fill assembly and are positioned parallel to the end walls, i.e., transversely to the center line of the cooling tower housing. The wire mesh rack 4 of each vertical hanger is a grid assembly having slender horizontal rods or wires 18 with slanted slender vertical wires or rods 19 which are fused together where they intersect. The wire mesh or grid is slanted, i.e., the vertical rods thereof, are slanted downwardly and inwardly and the degree of slant is predetermined to approximately correspond with the path of the water passing through the fill. The rods or wires comprising the wire fill racks are preferably covered with means to prevent deterioration as with a suitable plastic coating which may be of the type commonly employed in insulating electrical conductors. This coating may be of plastic, such as vinyl, epoxy, or enamel, for example. The rods or wires which comprise the wire mesh rack may also be fabricated of durable reinforced plastic or noncorrosive metal. The vertically hung wire mesh racks, thus, provide as shown in FIGS. 2 and 3 a plurality of openings through which splash bars 6 can be inserted and by which such splash bars are supported. The wire mesh racks 4 are in turn supported from the perforated water distributing pan slab 3a by hangers such as rods 7 which are extended through selected ones of the openings 17 through the pan slab. Means such as a suitable nut 20 or clamping device are positioned on the upper end of the hanger rod 7 to prevent the upper ends from passing through the selected holes in the water distributing pan slab 3a. At the lower end of the hanger rod 7 there is provided a hook 5 or other suitable means upon which the wire racks can be removably hung. Horizontal tie bars 16 are attached to the fill rack 4 at opposite sides thereof and at vertical intervals to prevent the wire fill rack from sagging or distorting. It has been found that horizontal tie bars 16 are preferably attached to the fill rack at intervals of approximately 8 feet vertically. Preferably the upper most tie bar is affixed near the upper edge of the fill rack 4 and is hung from the hangers 7 as shown in FIGURE 4, i.e., the hooks 5 are extended through the uppermost tie bar 16. The inner end of each of the tie bars is in turn affixed to the horizontally extending beam 14 which extends between the drift eliminator columns 13. Any suitable fastening means such as bolts at the end of tie bars can be utilized. The tie bars are thus horizontally affixed within the fill chamber and maintain the predetermined alignment of the vertically extending wires of the fill racks. Any form of rigid member can be employed as a tie bar. In the presently preferred embodiment elongate wooden members are placed on opposite sides of the wire mesh rack 4 and affixed together as with bolts 22.

With the fill racks installed within the fill assembly chamber of the cooling tower by being hung from the perforated distributing pan slab and horizontally affixed by the tie bars, the fill bar support within the cooling tower is complete. The fill bars which are shown as wooden bars of triangular cross section are then installed by merely slipping them through the wire fill racks as shown in FIGS. 2 and 3, such that they are supported in the predetermined position by the horizontal wires of the fill racks and retained horizontally by the vertical wires. Although these splash bars are shown as triangular and are formed of wood in the presently preferred embodiment, it will be apparent that other shapes may be employed as well as other materials such as light metals, cement or plastic. The choice of material would largely depend upon the kind of liquid being cooled. In any event, the splash bars are staggered and arranged such that all the liquid droplets falling from the distributing pan to the basin are widely dispersed and broken up to maintain a mist in the chamber for maximum cooling of the fluid. Thus, the liquid to be cooled is discharged into the distributing pan 3 from the liquid source through suitable pipes and valves 21 and distributed through pan outlets 17 over the fill portion of the tower. By this arrangement, the liquid to be cooled passes through the perforated distributing pan 3 and as it falls, it makes intimate contact with fill bars 6 and the cross-current of air caused by fan 8 to accomplish the desired cooling. From the foregoing it can be seen that the fill assembly can be quickly and easily installed into the hollow fill area and can be easily and quickly removed for cleaning or replacement.

What is claimed is:
1. A cooling tower comprising:
   a housing, said housing being formed substantially of concrete and defining a substantially hollow fill chamber, means for inducing air flow through said chamber;
   said housing including a roof structure formed of reinforced concrete and defining a water distributing pan of reinforced concrete therein, said pan having a plurality of vertical opnings therethrough in communication with said chamber;
   a plurality of hangers, means removably positioning said hangers within preselected ones of said vertical openings through said pan; and,
   a fill assembly means removably hanging said fill assembly from said hangers in preselected ones of said openings, said fill assembly including a plurality of grids, horizontally spaced and vertically extending splash bars positioned through said grids and supported by adjacent ones of said grids in a predetermined pattern, tie bars affixed to said grids and to said housing to horizontally position said grids relative to said housing.
2. The apparatus as defined in claim 1 in which said grids are wire mesh formed of horizontal wires and vertical wires with the vertical wires being inclined downwardly and inwardly substantially in alignment with the downward path of water droplets through the fill chamber.

References Cited

UNITED STATES PATENTS

| 1,750,047 | 3/1930 | Metzer | 261—103 |
| 2,002,065 | 5/1935 | Kryszewski et al. | 261 |
| 3,063,688 | 11/1962 | Fordyce et al. | 261—108 |

FOREIGN PATENTS

| 637,225 | 2/1962 | Canada. |
| 827,235 | 2/1962 | Great Britain. |

HARRY B. THORNTON, *Primary Examiner.*
RONALD R. WEAVER, *Examiner.*